(12) United States Patent
Johnson

(10) Patent No.: US 12,232,571 B2
(45) Date of Patent: Feb. 25, 2025

(54) SPIKE FOR FOOTWEAR HAVING RIGID PORTION AND RESILIENT PORTION

(71) Applicant: Nike, Inc., Beaverton, OR (US)

(72) Inventor: Jeffrey L. Johnson, Taichung (CN)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/479,629

(22) Filed: Oct. 2, 2023

(65) Prior Publication Data

US 2024/0023679 A1 Jan. 25, 2024

Related U.S. Application Data

(63) Continuation of application No. 16/799,318, filed on Feb. 24, 2020, now Pat. No. 11,877,627, which is a continuation of application No. 14/943,719, filed on Nov. 17, 2015, now Pat. No. 10,595,593, which is a (Continued)

(51) Int. Cl.
| | |
|---|---|
| *A43C 15/16* | (2006.01) |
| *A43C 15/02* | (2006.01) |
| *B29B 11/08* | (2006.01) |
| *B29B 11/14* | (2006.01) |
| *B29D 1/00* | (2006.01) |
| *B29D 35/00* | (2010.01) |
| *B29D 35/14* | (2010.01) |
| *B29K 19/00* | (2006.01) |
| *B29K 77/00* | (2006.01) |

(52) U.S. Cl.
CPC .......... *A43C 15/168* (2013.01); *A43C 15/02* (2013.01); *A43C 15/16* (2013.01); *A43C 15/165* (2013.01); *A43C 15/167* (2013.01); *B29B 11/08* (2013.01); *B29B 11/14* (2013.01); *B29D 1/00* (2013.01); *B29D 35/0009* (2013.01); *B29D 35/14* (2013.01); *B29K 2019/00* (2013.01); *B29K 2077/00* (2013.01)

(58) Field of Classification Search
CPC .......... A43B 5/001; A43B 5/02; A43B 23/20; A43B 15/16; A43B 15/162; A43B 15/165; A43B 15/167; A43B 15/168; A43B 15/02

See application file for complete search history.

(56) References Cited

U.S. PATENT DOCUMENTS

| | | | |
|---|---|---|---|
| 28,194 A * | 5/1860 | Porter | A43C 15/161 36/67 B |
| 1,515,330 A | 11/1924 | George | |
| 2,053,906 A | 9/1936 | Fuller | |

(Continued)

FOREIGN PATENT DOCUMENTS

| | | |
|---|---|---|
| AU | 709894 B2 | 9/1999 |
| DE | 3818151 A1 | 12/1989 |

(Continued)

OTHER PUBLICATIONS

European Patent Office, Communication pursuant to Article 94(3) EPC for Application No. 13737715.6, dated Apr. 13, 2017.

(Continued)

*Primary Examiner* — Katharine G Kane
(74) *Attorney, Agent, or Firm* — Bookoff McAndrews, PLLC

(57) ABSTRACT

A spike is operable to be removably coupled to an article of footwear. The spike includes a first portion that is substantially rigid. The spike also includes a second portion that is resilient.

20 Claims, 3 Drawing Sheets

Related U.S. Application Data continuation of application No. 13/472,037, filed on May 15, 2012, now Pat. No. 9,220,319.

(56) References Cited

U.S. PATENT DOCUMENTS

| | | | |
|---|---|---|---|
| 2,258,734 | A | 10/1941 | Brady |
| 2,309,783 | A | 2/1943 | Park |
| 2,584,182 | A | 2/1952 | Bernstein |
| 2,587,148 | A | 2/1952 | Gundersen |
| 2,697,288 | A | 12/1954 | Wilcox |
| 3,352,034 | A | 11/1967 | Braun |
| 3,525,165 | A | 8/1970 | Randall, Jr. |
| 3,553,858 | A | 1/1971 | Austin |
| 3,685,175 | A | 8/1972 | Granger, Jr. |
| 3,715,817 | A | 2/1973 | White et al. |
| 3,757,434 | A | 9/1973 | Granger |
| 3,766,670 | A | 10/1973 | Nakajima |
| 3,768,183 | A | 10/1973 | Fessenden |
| 3,828,364 | A | 8/1974 | Aoyama |
| 4,146,979 | A | 4/1979 | Fabbrie |
| 4,587,748 | A | 5/1986 | Collins |
| 4,723,366 | A | 2/1988 | Hagger |
| 4,783,913 | A | 11/1988 | Aoyama |
| 4,791,692 | A | 12/1988 | Collins |
| 4,922,636 | A | 5/1990 | Chen |
| 5,000,637 | A | 3/1991 | Adams |
| 5,132,182 | A | 7/1992 | Grosse-Puppendahl et al. |
| 5,243,775 | A | 9/1993 | Swain |
| 5,367,793 | A | 11/1994 | Deacon et al. |
| 5,426,873 | A | 6/1995 | Savoie |
| 5,572,807 | A | 11/1996 | Kelly et al. |
| 5,617,653 | A | 4/1997 | Walker et al. |
| 5,901,473 | A | 5/1999 | Heifort, IV |
| 5,906,059 | A | 5/1999 | Singer et al. |
| 5,957,642 | A | 9/1999 | Pratt |
| 5,996,260 | A | 12/1999 | MacNeill |
| 6,138,386 | A | 10/2000 | Singer et al. |
| 6,381,878 | B1 | 5/2002 | Kennedy et al. |
| 6,513,266 | B1 | 2/2003 | Tjiri |
| 7,047,674 | B1* | 5/2006 | Garvie ............ A43C 15/162 36/59 A |
| 7,070,725 | B2 | 7/2006 | Mathew et al. |
| 7,086,183 | B2 | 8/2006 | Wood et al. |
| 7,107,708 | B2 | 9/2006 | Kelly et al. |
| 7,731,883 | B2 | 6/2010 | Johnson et al. |
| 2002/0152644 | A1 | 10/2002 | Hokkirigawa et al. |
| 2002/0174571 | A1* | 11/2002 | Briant ............ A43B 13/26 36/134 |
| 2003/0118839 | A1 | 6/2003 | Ikuta et al. |
| 2004/0159020 | A1 | 8/2004 | Briant et al. |
| 2004/0255489 | A1 | 12/2004 | Kelly et al. |
| 2007/0277399 | A1 | 12/2007 | Dow et al. |
| 2007/0278716 | A1 | 12/2007 | Johnson et al. |
| 2010/0107450 | A1* | 5/2010 | Locke ............ A43C 15/02 36/62 |
| 2012/0042543 | A1 | 2/2012 | Bachmann et al. |
| 2012/0266490 | A1 | 10/2012 | Atwal et al. |
| 2013/0047465 | A1 | 2/2013 | Auger et al. |
| 2015/0305447 | A1 | 10/2015 | Cavaliere et al. |

FOREIGN PATENT DOCUMENTS

| | | | |
|---|---|---|---|
| GB | 1378461 | A | 12/1974 |
| GB | 2098457 | A | 11/1982 |
| JP | S57196903 | A | 12/1982 |
| JP | 2001087005 | A | 4/2001 |
| JP | 3321439 | B2 | 9/2002 |
| JP | 3478373 | B2 | 12/2003 |
| JP | 2012071616 | A | 4/2012 |
| JP | 5205507 | B2 | 6/2013 |

OTHER PUBLICATIONS

International Preliminary Report on Patentability and Written Opinion for Application No. PCT/US201/040872, dated Nov. 18, 2014.
International Preliminary Report on Patentability for Application No. PCT/US2013/040872, mailed on Nov. 18, 2014.
International Search Report and Written Opinion for Application No. PCT/US2013/040872, dated Oct. 17, 2013, 3 pages.
International Search Report and Written Opinion for Application No. PCT/US2013/040872, mailed on Oct. 17, 2013.
Japan Patent Office, Decision of Refusal for JP Application No. 2015-512734, dated Oct. 6, 2016.
Notification of Reason(s) for Refusal for Japanese Application No. 2015-512734, dated Jan. 26, 2016, 11 pages.
Response to Chinese Office Action as filed Jun. 6, 2016 for Chinese Patent Application No. 201380024983.3.
Second Office Action dated Mar. 21, 2016 for Chinese Application No. 201380024983.6, 12 pages.
The First Office Action dated Aug. 4, 2015 for Chinese Application No. CN201380024983.6 filed Nov. 13, 2014.
The First Office Action mailed Aug. 4, 2015 for Chinese Application No. CN201380024983.6 filed Nov. 14, 2014.
Third Office Action dated Aug. 26, 2016 for Chinese Application No. 201380024983.6, 12 pages (with English Translation).
United States Patent and Trademark Office, Final Office Action for U.S. Appl. No. 13/472,037, dated Jul. 1, 2015.
United States Patent and Trademark Office, Final Office Action for U.S. Appl. No. 13/472,037, dated Sep. 4, 2014.
United States Patent and Trademark Office, Final Office Action for U.S. Appl. No. 14/943,640, dated Jun. 7, 2019.
United States Patent and Trademark Office, Final Office Action for U.S. Appl. No. 14/943,719, mailed Jul. 26, 2018.
United States Patent and Trademark Office, Final Office Action for U.S. Appl. No. 14/943,719, mailed Jun. 7, 2019.
United States Patent and Trademark Office, Non-final Office Action for U.S. Appl. No. 13/472,037, dated Apr. 23, 2014.
United States Patent and Trademark Office, Non-final Office Action for U.S. Appl. No. 13/472,037, dated Jan. 21, 2015.
United States Patent and Trademark Office, Non-final Office Action for U.S. Appl. No. 14/943,640, dated Nov. 30, 2018.
United States Patent and Trademark Office, Non-final Office Action for U.S. Appl. No. 14/943,719, mailed Nov. 28, 2018.
United States Patent and Trademark Office, Office Action for U.S. Appl. No. 14/943,640, dated Feb. 13, 2018.
United States Patent and Trademark Office, Office Action for U.S. Appl. No. 14/943,640, dated Nov. 12, 2019.
United States Patent and Trademark Office, Office Action for U.S. Appl. No. 14/943,719, mailed Feb. 6, 2018.

* cited by examiner

SPIKE FOR FOOTWEAR HAVING RIGID PORTION AND RESILIENT PORTION

CROSS REFERENCE TO RELATED APPLICATIONS

This application is a continuation of U.S. application Ser. No. 16/799,318, filed Feb. 24, 2020, which is a continuation of U.S. application Ser. No. 14/943,719, filed Nov. 17, 2015 (now U.S. Pat. No. 10,595,593), which is a continuation of U.S. application Ser. No. 13/472,037, filed May 15, 2012 (now U.S. Pat. No. 9,220,319), each of which is incorporated by reference herein in its entirety.

FIELD

The present disclosure relates to a spike for footwear and, more particularly, to a spike for footwear having a rigid portion and a resilient portion.

BACKGROUND

This section provides background information related to the present disclosure which is not necessarily prior art.

Many types of footwear include spikes that improve traction. For instance, many running shoes include spikes that extend from the sole assembly. The spikes can penetrate into the running surface (e.g., dirt, grass, etc.) for enhancing the wearer's ability to push off from the running surface and improve his or her running performance.

In some cases, the spikes are removably connected to the sole of the footwear. For instance, the spikes can be threadably attached to the sole. Thus, the wearer can interchange the spikes to configure the footwear as desired (e.g., to include spikes of a desired length, width, material, etc.).

Typically, spikes are made of rigid metal. As such, these spikes can readily penetrate into softer running surfaces. However, these spikes are unlikely to penetrate harder surfaces, such as pavement, and the wearer may lose traction on these surfaces. For instance, portions of a single cross country race might be routed over grass, and other portions of the race might be routed over pavement. In this case, spikes would provide traction over the grassy portions of the race, but the spikes could prove to be a disadvantage over the paved portions.

SUMMARY

This section provides a general summary of the disclosure, and is not a comprehensive disclosure of its full scope or all of its features.

A spike is disclosed that is operable to be removably coupled to an article of footwear. The spike includes a first portion that is substantially rigid. The spike also includes a second portion that is resilient.

A method of manufacturing a spike that is operable for removably coupling to an article of footwear is also disclosed. The method includes providing a first portion that is substantially rigid and providing a second portion that is resilient. The method further includes chemically bonding the first and second portions together.

Moreover, an article of footwear is disclosed that includes a sole and a spike. The spike includes a first portion that is substantially rigid and a second portion that is resilient. The first and second portions are chemically bonded together. The first portion is made out of a polyether block amide, and the second portion is made out of carboxylated rubber. The first portion includes a threading for removably engaging with the sole. The second portion extends away from the first portion and terminates at a second end. A width of the second portion tapers downward in a direction from the first portion to the second end.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
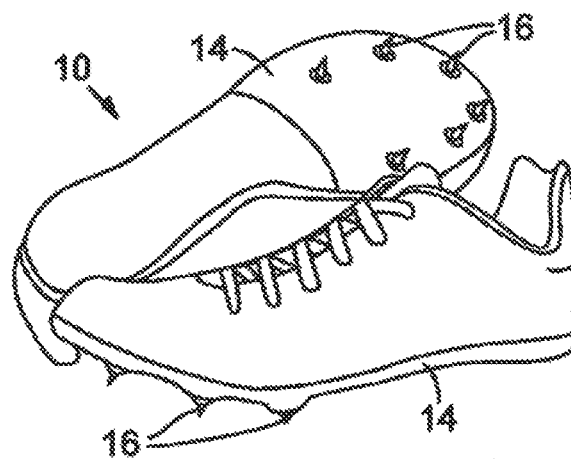
FIG. 1 is a perspective view of a pair of shoes that include spikes of the present disclosure.

Referring initially to FIG. 1, exemplary embodiments of articles of footwear 10 are illustrated. The footwear 10 can be running shoes, golf shoes, or any other type of footwear 10 without departing from the scope of the present disclosure. As shown, the footwear 10 can include an upper 12 and a sole 14. The footwear 10 can also include a midsole (not specifically shown), which provides cushioning between the upper 12 and the sole 14. Moreover, the footwear 10 can include one or more spikes 16. The spikes 16 can be operably coupled to the sole 14 and can project therefrom. The spikes 16 can be short and narrow such that the spikes 16 can readily penetrate into the ground, grass, dirt, or other surface upon which the wearer is treading.

In some embodiments, the spikes 16 can be removably coupled to the sole 14 as will be discussed in greater detail below. Thus, the spikes 16 of the footwear 10 can be interchangeable with longer or shorter spikes, with spikes of different materials, etc. However, the spikes 16 could be permanently fixed to the sole 14 in other embodiments without departing from the scope of the present disclosure. Moreover, the spikes 16 could have any suitable shape other than those shown in FIG. 1. In addition, the term "spike" is defined broadly herein to cover spikes, cleats, and other objects that project from a sole 14 of an article of footwear 10 to improve traction for the wearer.

Figure 2:
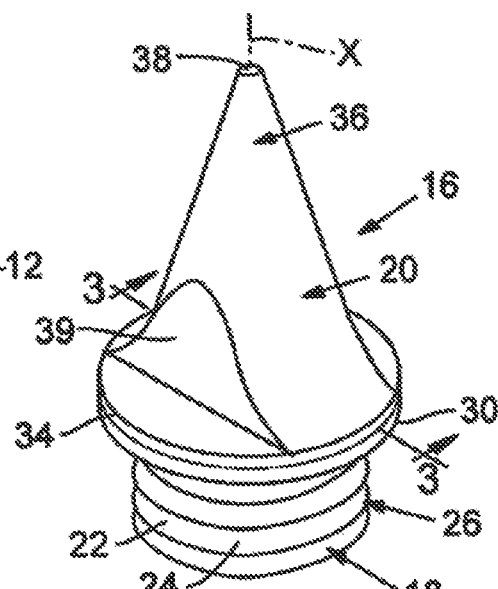
FIG. 2 is a perspective view of a spike of the present disclosure.
Figure 3:
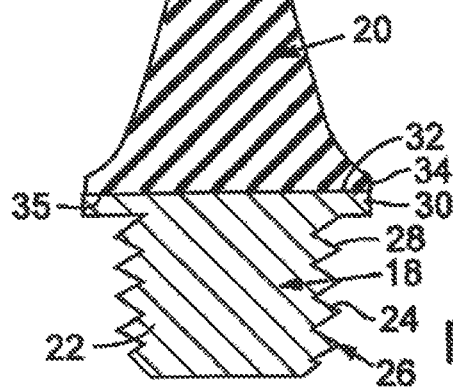
FIG. 3 is a cross section of the spike taken along line 3-3 of FIG. 2.

Referring now to FIGS. 2 and 3, exemplary embodiments of the spike 16 will be discussed in greater detail. The spike 16 can include a first portion 18 and a second portion 20. The first portion 18 can be removably coupled to the sole 14, and the second portion 20 can extend and project from the sole 14. In some embodiments, the first portion 18 can be substantially hard and rigid, and the second portion 20 can be resilient (elastic, resiliently compressible, flexible, etc.). As such, the second portion 20 of the spike 16 can resiliently flex, for instance, when treading on hard surfaces (e.g., concrete, pavement, etc.) such that the wearer is less likely to lose traction. However, the rigidity of the first portion 18 can help the spike 16 to remain attached to the sole 14 of the footwear 10.

In some embodiments, the first portion 18 of the spike 16 can be made out of polymeric material. For instance, the first portion 18 can be made of a polyether block amide, such as PEBAX™, which is commercially available from Arkema, Inc. The first portion 18 can also be made of nylon or nylon-containing thermoplastic material as well. More specifically, the first portion 18 can contain at least 30% by weight of nylon. Also, it will be appreciated that the first portion 18 could be made out of any other suitable material. The first portion 18 can have a durometer between 40 and 75 on the Shore D scale. In additional embodiments, the first portion 18 can have a durometer between 45 and 85 on the Shore D scale. Accordingly, the first portion 18 can have very high hardness and can behave similar to metal, for instance, to ensure attachment to the sole 14.

Likewise, in some embodiments, the second portion 20 of the spike 16 can be made out of polymeric material. For instance, the second portion 20 can be made of a rubber, such as carboxylated rubber (i.e., a carboxyl group-containing rubber). More specifically, the second portion 20 can be made of a rubber composition which consists of 100 parts by weight of a carboxyl group-containing rubber, 100-300 parts by weight of fillers, and 1-10 parts by weight of a peroxide as a vulcanizing agent. However, the second portion 20 could be made out of any other suitable material. The second portion 20 can have a durometer between 45 and 95 on the Shore A scale. As such, the second portion 20 can be somewhat hard, but more compliant than the first portion 18.

Furthermore, the first and second portions 18, 20 can be directly bonded (chemically bonded) together without adhesives as will be discussed in greater detail below. As such, the first and second portions 18, 20 can be manufactured in a relatively efficient manner, and the spike 16 can be very durable. The materials of the first and second portions 18, 20 and the portions 18, 20 can be bonded together according to the teachings of U.S. Pat. No. 5,132,182, filed Feb. 21, 1991, issued Jul. 21, 1992, and claiming priority to DE 3818151, each of which is hereby incorporated by reference in its entirety.

Specific features of the first portion 18 will now be discussed. As shown in FIGS. 2 and 3, the first portion 18 can generally include a generally cylindrical base 22 with an outer surface 24. The outer surface 24 can include an engagement member 26 for removably engaging with the sole 14 of the footwear 10. In some embodiments, the engagement member 26 can be threading 28 such that the base 22 can be threadably attached to the sole 14 of the footwear 10. It will be appreciated, however, that the engagement member 26 could be of any other type.

The first portion 18 can also include a flat, disc-shaped first flange 30. The flange 30 can be centered on the base 22 such that the flange 30 extends radially therefrom. The flange 30 can include a substantially flat first mating surface 32 that faces opposite the base 22.

The second portion 20 can also include a substantially flat, disc-shaped second flange 34 having a second mating surface 35. The second mating surface 35 can face the first mating surface 32 and can be chemically bonded thereto without separate adhesives.

The second portion 20 can also include a tapered member 36 that extends away from the first portion 18 and the second flange 34. The tapered member 36 can be substantially centered on the second flange 34. The tapered member 36 can have any shape, such as a substantially frusto-conic shape, and can terminate at a second end 38. The width of the tapered member 36 can taper downward gradually in a direction from the first portion 18 to the second end 38.

Also, the second portion 20 can include one or more (e.g., two) keying surfaces 39. The keying surface 39 can be planar and can extend along the tapered member 36 perpendicularly from the second flange 34. The keying surface 39 can provide a flat surface against which a tool (not shown) can abut for drivingly rotating the spike 16 about its longitudinal axis X during attachment and removal from the sole 14 of the footwear 10.

Thus, the spike 16 can increase traction for the wearer of the footwear 10 by penetrating into a surface (grass, dirt, etc.). However, when treading on harder surfaces, such as concrete, the spike 16 may not penetrate. Nevertheless, the second portion 20 can resiliently compress such that traction is not reduced significantly. Also, the compression can absorb some shock loads to provide cushioned support on these harder surfaces. Moreover, the second portion 20 can resiliently recover once the wearer begins to tread on softer surfaces again such that the spike 16 can once again penetrate the softer surface. Furthermore, the first portion 18 can be rigid and hard to remain attached to the sole 14 of the footwear 10 despite this resilient deflection of the second portion 20.

Figure 4:
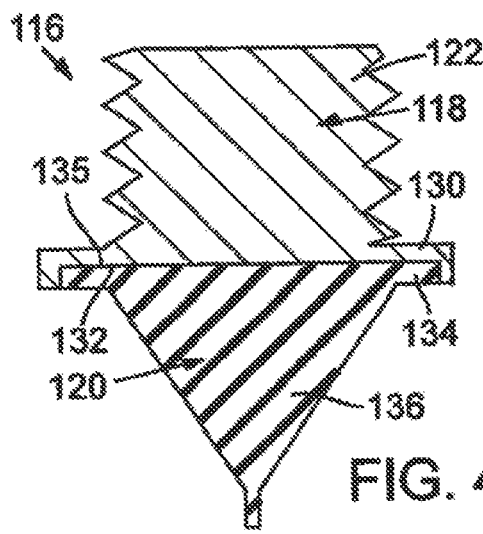
FIG. 4 is a cross section of the spike according to additional exemplary embodiments.

Referring now to FIG. 4, additional embodiments of the spike 116 will be discussed. Components of the spike 116 that correspond to the embodiments of FIGS. 2 and 3 are identified by corresponding reference numerals, increased by 100.

As shown, the first portion 118 can include a base 122 and a first flange 130, and the second portion 120 can include a second flange 134 and a tapered member 136. In the embodiments shown, the second flange 134 can be partially embedded within the first flange 130; however, in other embodiments, the first flange 130 can be embedded within the second flange 134. As such, the mating surfaces 132, 135 can be non-planar.

Figure 5:
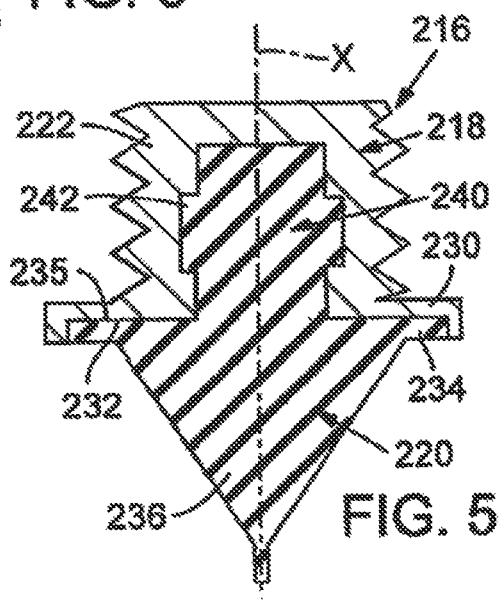
FIG. 5 is a cross section of the spike according to additional exemplary embodiments.

Referring now to FIG. 5, additional embodiments of the spike 216 will be discussed. Components of the spike 216 that correspond to the embodiments of FIGS. 2 and 3 are identified by corresponding reference numerals, increased by 200.

The embodiments of FIG. 5 can be substantially similar to those of FIG. 4. However, the second member 220 can include a second projection 240 that is integrally connected to the second flange 234 and the tapered member 236. The second projection 240 can be substantially cylindrical with an annular rib 242 thereon. The annular rib 242 can extend continuously about the projection 240. The second projection 240 can project from the second flange 234 and through the first flange 230 to be embedded within the base 222 of the first portion 218. Thus, the mating surfaces 232, 235 can be defined between the first and second flanges 230, 234 as well as between the second projection 240 and the base 222 of the first portion 218. Thus, there is increased surface area for bonding. Also, the rib 242 projects radially from the axis to thereby provide additional mechanical fixation between the first and second portions 218, 220.

Figure 6:
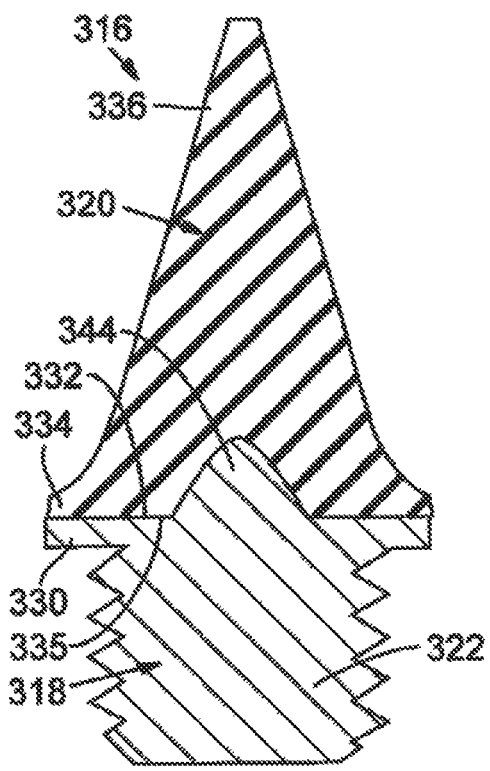
FIG. 6 is a cross section of the spike according to additional exemplary embodiments.

Referring now to FIG. 6, additional embodiments of the spike 316 will be discussed. Components of the spike 316 that correspond to the embodiments of FIGS. 2 and 3 are identified by corresponding reference numerals, increased by 300.

As shown, the first portion 318 can include a first projection 344 that is dome shaped and that is integrally connected to the first flange 330 and the base 322. The first projection 344 can project from the first flange 330 to be embedded within the second portion 320. Thus, the mating surfaces 332, 335 can be defined between the first and second flanges 330, 334 as well as between the first projection 344 and the interior of the tapered member 336. Thus, there is increased surface area for bonding between the first and second portions 318, 320.

Figure 7:
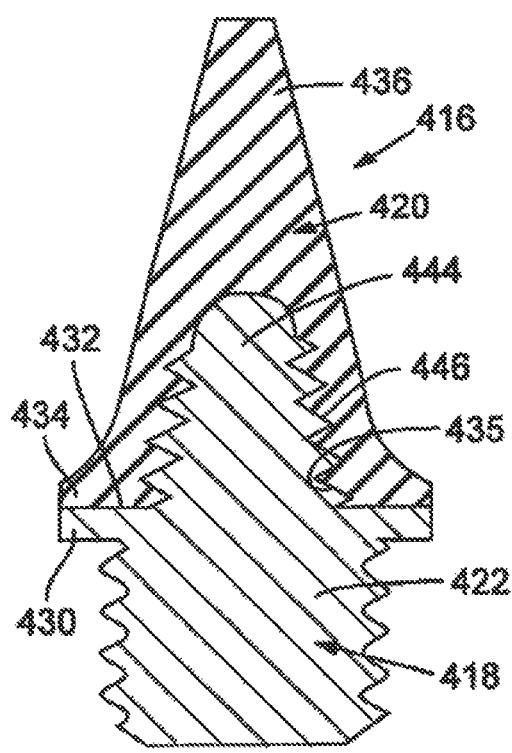
FIG. 7 is a cross section of the spike according to additional exemplary embodiments.

Referring now to FIG. 7, additional embodiments of the spike 416 will be discussed. Components of the spike 416 that correspond to the embodiments of FIGS. 2 and 3 are identified by corresponding reference numerals, increased by 400.

The embodiments of FIG. 7 can be substantially similar to those of FIG. 6. However, the first projection 444 can include one or more ribs 446 that extend radially therefrom. In the embodiments illustrated, there are a plurality of ribs 446 having generally triangular cross sections; however, the ribs 446 could have any suitable shape. The ribs 446 (ribbed mating surface) can increase the surface area of the mating surfaces 432, 435 between the first and second members 418, 420, to strengthen bonding between the first and second portions 418, 420. Also, it will be appreciated that the ribs 446 could be included on the second portion 420 and can be embedded in and bonded to the first portion 418 without departing from the scope of the present disclosure.

Figure 8:
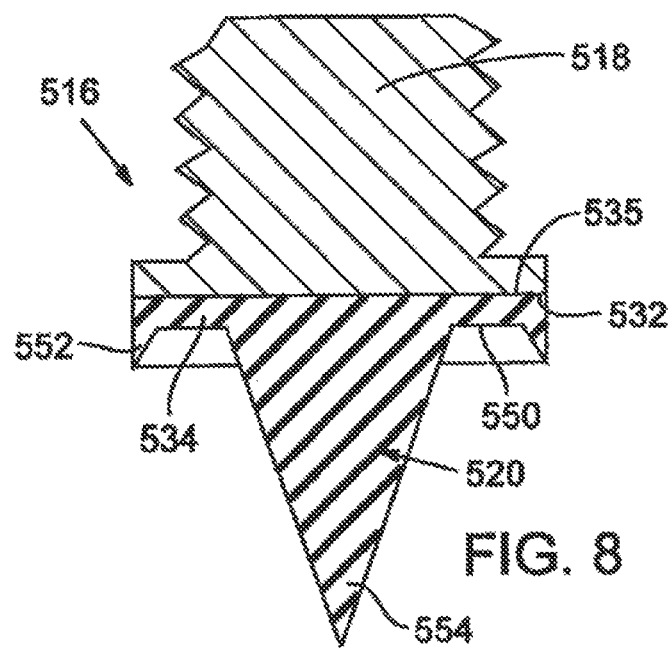
FIG. 8 is a cross section of the spike according to additional exemplary embodiments.

Referring now to FIG. 8, additional embodiments of the spike 516 are illustrated. Components of the spike 516 that correspond to the embodiments of FIGS. 2 and 3 are identified by corresponding reference numerals, increased by 500.

As shown, the first portion 518 can be substantially similar to the embodiments of FIG. 3. Also, the second portion 520 can include the second flange 534 with the mating surface 535 and an outer surface 550 that is opposite the mating surface 535. The second portion 520 can also include an annular ridge 552 that projects from a periphery of the outer surface 550 away from the first portion 518. Moreover, the second portion 520 can include a central projection 554 that is centered on the second flange 534 and that projects away from the first portion 518. The annular ridge 552 can continuously encircle the projection 554. Also, the central projection 554 can be conic or frusto-conic in shape.

Figure 9A:
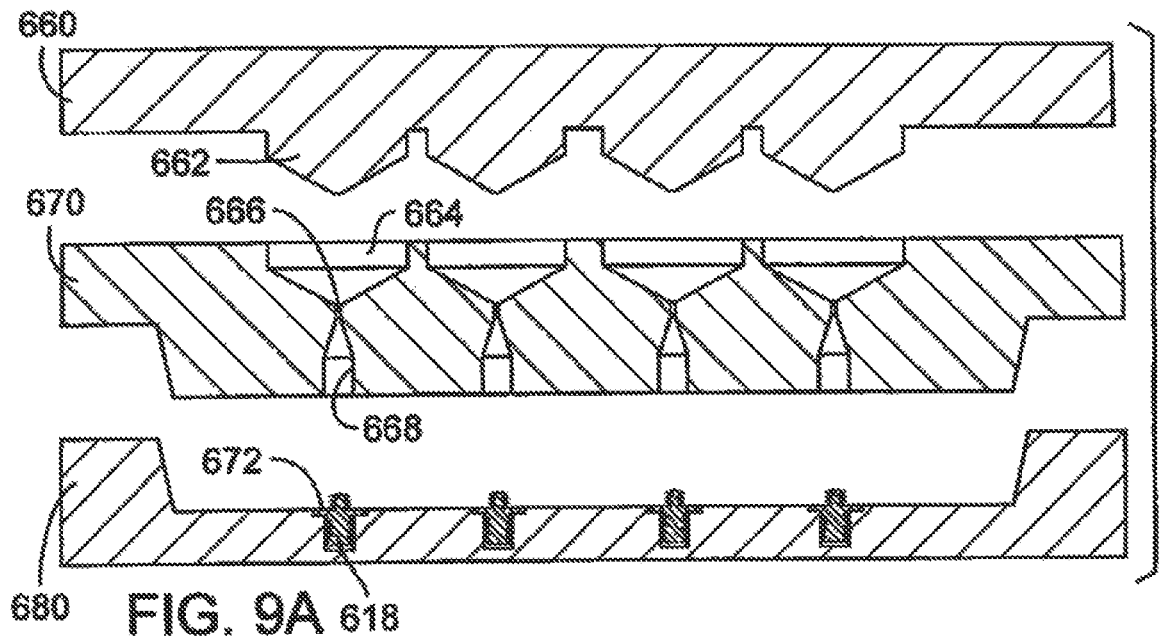
FIGS. 9A and 9B are schematic representations of a manufacturing technique for manufacturing the spikes of the present disclosure.
Figure 9B:
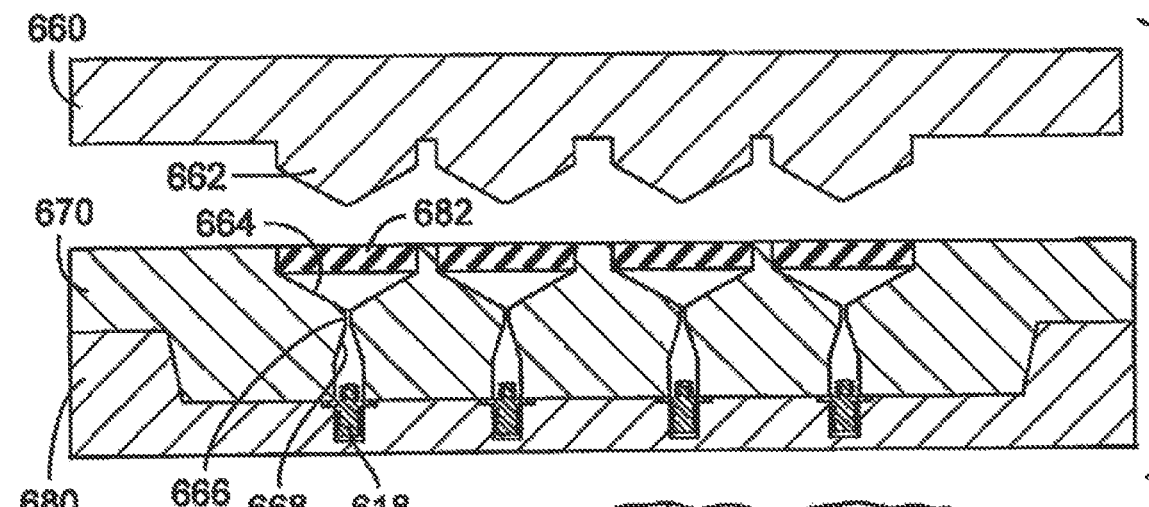
Figure 10:
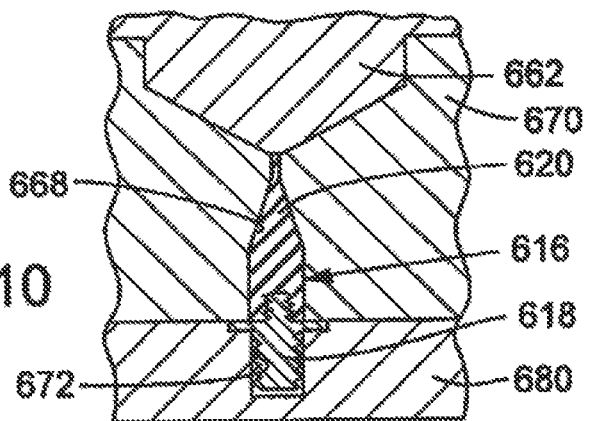
FIG. 10 is a detail view of a mold cavity for manufacturing the spikes of the present disclosure.

Referring now to FIGS. 9A, 9B, and 10, a method of manufacturing the spikes 616 are illustrated according to exemplary embodiments. Components that correspond to the embodiments of FIGS. 2 and 3 are identified by corresponding reference numerals, increased by 600.

Generally, the spikes 616 can be formed via transfer compression molding and bonding the first and second portions 618, 620 together. As shown in FIG. 9A, a top, middle, and bottom plate 660, 670, 680 can be provided. The top plate 660 can include one or more (e.g., three) plungers 662 that project downwardly therefrom. The middle plate 670 can include a corresponding number of openings 664. The openings 664 can be shaped according to that of the plungers 662. The middle plate 670 can also include feed-through passages 666 that are fluidly connected to corresponding openings 664. The passages 666 can be much narrower than the openings 664. The middle plate 670 can further include mold cavities 668 that are in fluid connection with corresponding ones of the passages 666. The mold cavities 668 can be shaped according to the second portion 620 of the spikes 616. The bottom plate 680 can include receptacles 672 that are each shaped to receive and hold pre-formed first portions 618 of the spikes 616.

The first portions 618 can be formed by conventional injection molding processes and then positioned within respective receptacles 672 of the bottom plate 680. Then, the middle plate 670 can be mated against the bottom plate 680 (FIG. 9B), and flowable material 682 of the second portion 620 can be introduced into the openings 664. Then, as shown in FIG. 10, the top plate 660 can be mated against the middle plate 670 such that the plungers 662 push the material 682 into the mold cavity 668 (i.e., the material 682 can flow into the mold cavity 668). Upon curing, the first and second portions 618,620 can be chemically bonded with each other, for instance, as described in U.S. Pat. No. 5,132,182, filed Feb. 21, 1991, issued Jul. 21, 1992, and claiming priority to DE 3818151, each of which is hereby incorporated by reference in its entirety. Then, the plates 660, 670, 680 can be separated, and the spikes 616 can be removed therefrom. Accordingly, the spikes 616 can be manufactured in an efficient, cost effective, and repeatable manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A spike for an article of footwear, the spike comprising:
 a first portion configured to be attached to the article of footwear, the first portion including (i) a base extending from a first end to a second end along an axial direction, and (ii) a first flange extending radially outward from the first end of the base, wherein the first flange includes a first mating surface formed on an opposite side of the first flange than the base; and
 a second portion including (i) a second flange including a second mating surface attached to the first mating surface of the first portion and an outer surface opposite the second mating surface, and (ii) a single annular ridge continuously projecting from a periphery of the outer surface away from the first portion, wherein the second portion forms a ground-engaging surface of the spike.

2. The spike of claim 1, wherein the first portion includes an exposed surface opposite the first mating surface.

3. The spike of claim 1, wherein the first portion includes a fastener operable to attach the first portion to the article of footwear, and wherein the fastener includes a series of threads.

4. The spike of claim 1, wherein the second portion includes a central projection, and wherein the central projection is centered on the second flange and projects away from the first portion.

5. The spike of claim 4, wherein the central projection of the second portion forms the ground-engaging surface of the spike.

6. The spike of claim 4, wherein the single annular ridge continuously encircles the central projection.

7. The spike of claim 4, wherein the central projection is conic or frusto-conic in shape.

8. The spike of claim 4, wherein a radially outermost edge of the first portion is a radially outermost portion of the spike, and wherein a radially outermost edge of the second portion is positioned at the radially outermost portion of the spike.

9. A spike for an article of footwear, the spike comprising:
a first portion configured to be attached to the article of footwear and being formed from a first polymeric material having a first hardness, the first portion including (i) a base extending from a first end to a second end along an axial direction, and (ii) a first flange extending radially outward from the first end of the base, wherein the first flange includes a first mating surface formed on an opposite side of the first flange than the base, and wherein a radially outermost portion of the first flange is exposed; and
a second portion including (i) a second flange including a second mating surface attached to the first mating surface of the first portion and an outer surface opposite the second mating surface, and (ii) an annular ridge projecting from and outlining a periphery of the outer surface away from the first portion, wherein the periphery continuously extends along the outer surface, wherein the second flange includes an exposed radially outermost portion, and wherein the second portion forms a ground-engaging surface of the spike and is formed from a second polymeric material having a second hardness that is different from the first hardness.

10. The spike of claim 9, wherein first portion includes an exposed surface opposite the first mating surface.

11. The spike of claim 9, wherein the first polymeric material is a nylon material.

12. The spike of claim 11, wherein the nylon material contains at least 30% weight of nylon.

13. The spike of claim 9, wherein the second polymeric material is rubber.

14. The spike of claim 9, wherein the first portion includes a durometer between 40 and 75 on the Shore D scale, and wherein the second portion includes a durometer between 45 and 95 on the Shore A scale.

15. The spike of claim 9, wherein the second hardness is less than the first hardness.

16. The spike of claim 9, wherein the exposed radially outermost portion of the first flange is a radially outermost portion of the spike where the first flange is positioned, and wherein the exposed radially outermost portion of the second flange is a radially outermost portion of the spike where the second flange is positioned.

17. A spike for an article of footwear, the spike comprising:
a first portion configured to be attached to the article of footwear and being formed from a nylon material having a first hardness, the first portion including (i) a base extending from a first end to a second end along an axial direction, and (ii) a first flange extending radially outward from the first end of the base, wherein the first flange includes a first mating surface formed on an opposite side of the first flange than the base; and
a second portion including (i) a second flange including a second mating surface attached to the first mating surface of the first portion and an outer surface opposite the second mating surface, (ii) an annular ridge projecting from a periphery of the outer surface away from the first portion, and (iii) a central projection being centered on the second flange and projecting away from the first portion, wherein the annular ridge continuously encircles the central projection along the periphery, wherein a cross-sectional profile of the annular ridge taken along a plane parallel to a longitudinal axis of the first portion tapers to a point, and wherein the central projection forms a ground-engaging surface of the spike.

18. The spike of claim 17, wherein a radially outermost edge of the first portion is a radially outermost portion of the spike, and wherein a radially outermost edge of the second portion is positioned at the radially outermost portion of the spike.

19. The spike of claim 17, wherein the first portion includes an exposed surface opposite the first mating surface.

20. The spike of claim 17, wherein the annular ridge includes an exposed surface opposite the outer surface of the second portion.

* * * * *